United States Patent
Billig et al.

(10) Patent No.: US 7,334,655 B2
(45) Date of Patent: Feb. 26, 2008

(54) CONTROL SYSTEM FOR AN AT LEAST TEMPORARILY FOUR WHEEL-DRIVEN MOTOR VEHICLE

(75) Inventors: Christian Billig, Munich (DE); Thomas Hopper, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/397,719

(22) Filed: Apr. 5, 2006

(65) Prior Publication Data
US 2006/0191729 A1    Aug. 31, 2006

Related U.S. Application Data

(63) Continuation of application No. PCT/EP2004/011168, filed on Oct. 6, 2004.

(30) Foreign Application Priority Data
Oct. 8, 2003    (DE)    ............... 103 46 673

(51) Int. Cl.
| B60K 28/16 | (2006.01) |
| B60K 17/35 | (2006.01) |
| F16D 43/20 | (2006.01) |
| B60W 10/02 | (2006.01) |

(52) U.S. Cl. ............ 180/197; 180/248; 192/54.1; 477/86

(58) Field of Classification Search ............ 701/67, 701/68, 69, 87, 89; 180/197, 247, 248; 477/39, 477/70, 79, 86; 192/54.1
See application file for complete search history.

(56) References Cited

U.S. PATENT DOCUMENTS

| 4,776,424 A | * | 10/1988 | Naito ..................... 180/233 |
| 4,825,368 A | * | 4/1989 | Itoh et al. ................ 701/69 |
| 4,866,624 A | * | 9/1989 | Nishikawa et al. ........ 701/89 |
| 4,874,056 A | * | 10/1989 | Naito ..................... 180/233 |
| 4,989,686 A | * | 2/1991 | Miller et al. ............ 180/197 |
| 5,631,829 A | * | 5/1997 | Takasaki et al. ......... 701/69 |
| 5,754,970 A | * | 5/1998 | Takasaki et al. ......... 701/87 |

(Continued)

FOREIGN PATENT DOCUMENTS

DE    195 13 516 A1    10/1996

(Continued)

OTHER PUBLICATIONS

International Search Report for PCT/EP2004/011168 dated Jan. 18, 2005.

(Continued)

*Primary Examiner*—Lesley D. Morris
*Assistant Examiner*—Daniel Yeagley
(74) *Attorney, Agent, or Firm*—Crowell & Moring LLP

(57) ABSTRACT

A control unit of a control system for an at least temporarily four wheel-driven motor vehicle is arranged such that a displacement path for an actuator that actuates a transmission clutch is assigned to a setpoint clutch torque via a characteristic curve, and the control unit checks whether slip of the transmission clutch occurs when a displacement path is specified that should result in an at least fully locked state of the transmission clutch according to the characteristic curve.

18 Claims, 2 Drawing Sheets

U.S. PATENT DOCUMENTS

Figure 1:
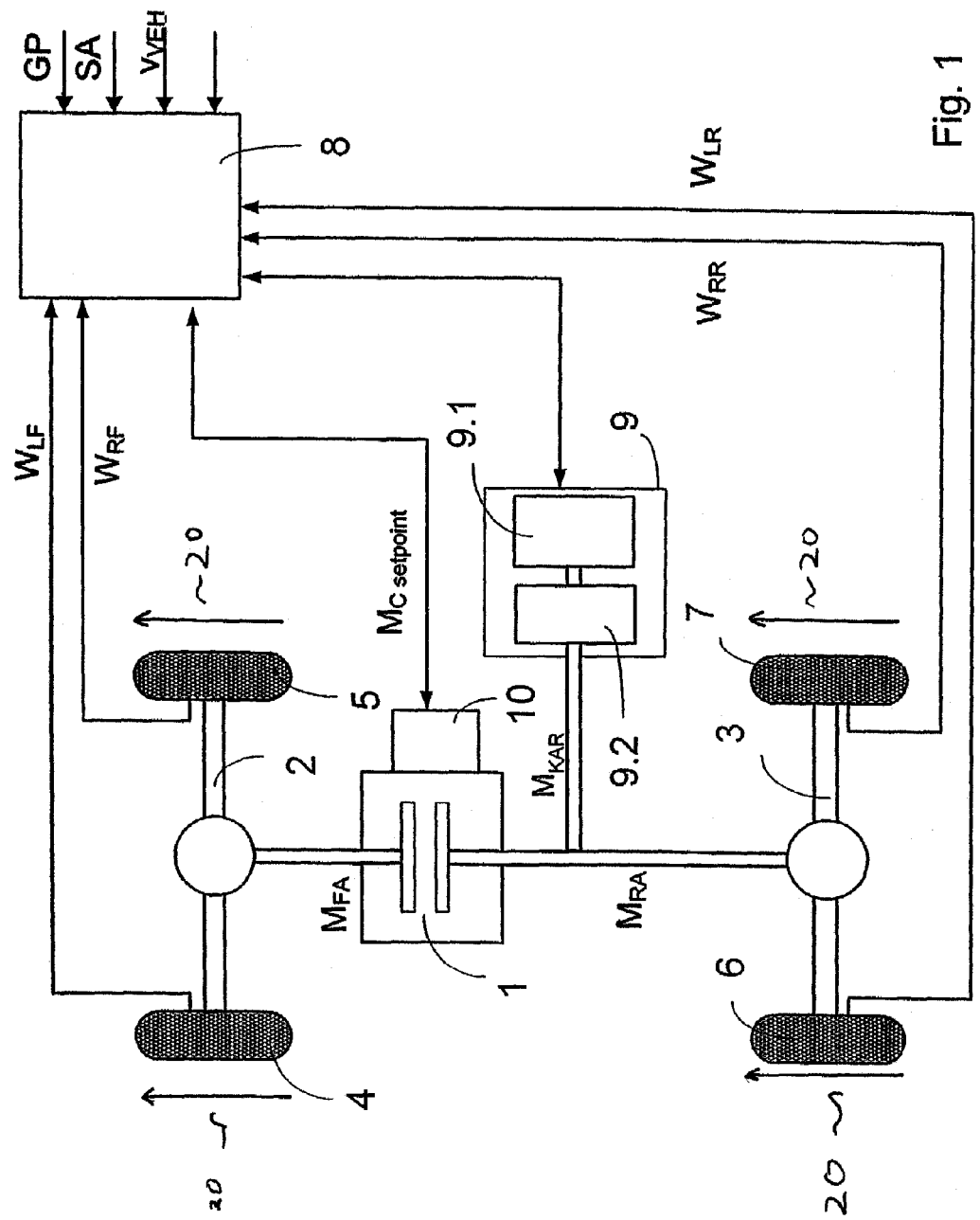

| | | | |
|---|---|---|---|
| 5,839,084 A * | 11/1998 | Takasaki et al. | 701/67 |
| 5,875,865 A * | 3/1999 | Wakahara et al. | 180/248 |
| 5,927,425 A * | 7/1999 | Kusano | 180/248 |
| 6,001,044 A * | 12/1999 | Amendt | 477/180 |
| 6,330,928 B1 * | 12/2001 | Sekiya et al. | 180/242 |
| 6,386,351 B1 * | 5/2002 | Salecker et al. | 192/54.1 |
| 6,808,037 B1 * | 10/2004 | Mueller | 180/247 |
| 2005/0177295 A1 * | 8/2005 | Rodrigues et al. | 701/67 |
| 2005/0230172 A1 * | 10/2005 | Hopper | 180/247 |

FOREIGN PATENT DOCUMENTS

| | | |
|---|---|---|
| DE | 196 39 291 C1 | 4/1998 |
| DE | 100 54 023 A1 | 5/2002 |
| EP | 0 319 830 A1 | 6/1989 |
| EP | 1 203 687 A1 | 5/2002 |
| EP | 1 270 305 A2 | 1/2003 |
| WO | WO 02/18814 A1 | 3/2002 |

OTHER PUBLICATIONS

Written Opinion of International Searching Authority for PCT/EP2004/011168.

German Examination Report for 103 46 673.8-51 dated Jul. 9, 2004.

* cited by examiner

CONTROL SYSTEM FOR AN AT LEAST TEMPORARILY FOUR WHEEL-DRIVEN MOTOR VEHICLE

CROSS REFERENCE TO RELATED APPLICATIONS

This application is related to U.S. application Ser. No. 11/397,559, filed on even date herewith entitled Control System for an At Least Temporarily Four Wheel-Driven Motor Vehicle.

This application claims priority under 35 U.S.C. § 120 to International Patent Application No. PCT/EP2004/011168 filed Oct. 6, 2004, and under 35 U.S.C. § 119 to German Patent Application No. 103 46 673.8 filed Oct. 8, 2003, the entire disclosure of these documents is herein expressly incorporated by reference.

BACKGROUND AND SUMMARY OF THE INVENTION

The invention relates to a control system for an at least temporarily four wheel-driven motor vehicle.

Such control systems are described in German Patent Document No. DE 100 54 023 A1, for example, according to which a torque distribution device is known for modifying the torque distribution ratio between the wheels on the front axle and the wheels on the rear axle by corresponding control of a friction clutch as a longitudinal lock (transmission clutch). The driving characteristics of a vehicle may be influenced considerably by determining a torque distribution ratio. DE 100 54 023 A1 in particular relates to driving dynamics when cornering.

In the following description, as a generalization the wheels permanently connected to the drive unit are referred to as primary drive wheels, and the wheels which may be connected as required to the drive unit via the transmission clutch are referred to as secondary drive wheels.

Exemplary embodiments of the present invention provide a control system of the aforementioned type with improved accuracy in the control of the transmission clutch.

The invention is based on the finding that for a new system the characteristic curve in the control unit by which a displacement path is assigned to a setpoint clutch torque results in a relatively accurate actual clutch torque corresponding to the setpoint clutch torque. In an earlier system, however, the same displacement path could result in an actual clutch torque that was less than the setpoint clutch torque. This can be identified when a displacement path is specified which for a new system should result in a fully locked or even overlooked state, but which actually results in only a partially locked state. The partially locked state causes slip of the transmission clutch, which can be identified by the control unit in particular by the measured or computed difference between the angular velocity of the drive shaft for the front axle and the angular velocity of the drive shaft for the rear axle.

This slip plausibility checking preferably is performed by use of the wheel speed sensors or wheel angular velocity sensors which are present anyway. In this regard, the accuracy of the diagnosis can be increased when it is made under operating conditions which ensure that the least possible wheel slip can occur, except as provided by the control accuracy of the transmission clutch or the actuator thereof.

The advantage of the invention lies in the diagnosis of control accuracy without additional sensors.

Other objects, advantages and novel features of the present invention will become apparent from the following detailed description of the invention when considered in conjunction with the accompanying drawings.

BRIEF DESCRIPTION OF THE DRAWING FIGURES

Figure 2:
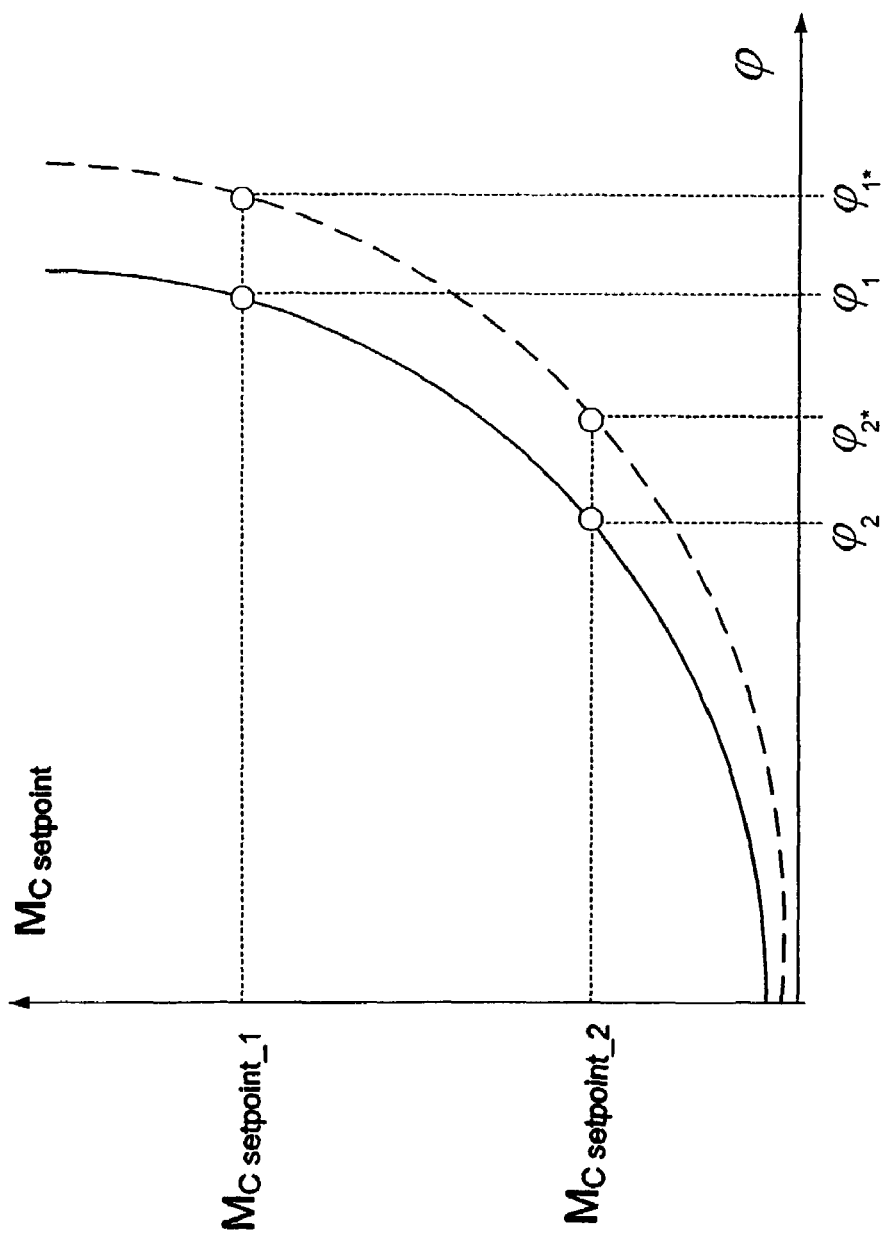

The drawing illustrates an exemplary embodiment of the invention, as follows:

FIG. 1 schematically shows a temporarily four wheel-driven vehicle having a transmission clutch which may be adjusted by a control unit, using the example of a basically rear wheel-driven motor vehicle which may be switched to front wheel drive via a transmission clutch; and FIG. 2 shows an example of a characteristic curve, as originally stored (represented by a solid line) and as corrected (represented by a dashed line), for assigning a specified setpoint clutch torque to a displacement path of the actuator.

DETAILED DESCRIPTION OF THE PREFERRED EMBODIMENTS

FIG. 1 illustrates a temporarily four wheel-driven vehicle in the form of a basically rear wheel-driven motor vehicle which may be switched to front-wheel drive as required via a transmission clutch 1. The transmission clutch 1 is adjustable by means of a control unit 8. The control unit 8 may contain an externally situated auxiliary control device 10 which, for example, converts the specified setpoint clutch torque $M_{C\ setpoint}$ to a current for controlling the adjustment unit for the transmission clutch 1. A characteristic curve, preferably stored in the control unit 8 or in the auxiliary control device 10 (if present), assigns a defined displacement path $\phi$ of the actuator to a setpoint clutch torque $M_{C\ setpoint}$ (see FIG. 2, solid line).

In a vehicle according to FIG. 1, a disengaged transmission clutch 1 transmits the entire torque (total drive torque $M_{KAR}$) of the drive unit 9, which preferably comprises an internal combustion engine 9.1, a transmission 9.2, and at least one drive control device (not specifically illustrated here), to the wheels 6 and 7 on the rear axle 3. In this case the rear wheels 6 and 7 are the primary drive wheels, since they are permanently connected to the drive unit 9. As the clutch torque on the transmission clutch 1 increases, the drive unit 9 also drives wheels 4 and 5 on the front axle 2. Thus, the front wheels 4 and 5 are the secondary drive wheels.

For variable torque distribution or for determining a setpoint clutch torque $M_{c\ setpoint}$ to be specified, the control unit 8 also detects additional input signals, in particular the wheel speeds or wheel angular velocities $w_{LF}$, $w_{LR}$, $w_{RF}$, $W_{RR}$ of all wheels 4, 5, 6, 7. For this purpose the control unit 8 also detects or determines, for example, the vehicle speed $v_{VEH}$, the steering angle SA, and the gas pedal value GP. For the diagnosis according to the invention, the angular velocity $w_{FA}$ of the drive shaft with respect to the front axle 2 and the angular velocity $w_{RA}$ of the drive shaft with respect to the rear axle are computed from the wheel angular velocities $w_{LF}$, $w_{LR}$, $w_{RF}$, $w_{RR}$, which are detected anyway. If the control unit 8 or auxiliary control device 10 detects a difference between the angular velocities $W_{FA}$ and $w_{RA}$, slip of the transmission clutch 1 is present.

Depending on the specified setpoint clutch torque $M_{C\ setpoint}$, i.e., the displacement path $\phi$ of the actuator for the transmission clutch 1 which is adjusted by means of the characteristic curve in FIG. 2 resulting from the setpoint clutch torque $M_{C\ setpoint}$, the total drive torque $M_{KAR}$, is divided into a drive torque $M_{FA}$ transmitted from the front axle and a drive torque $M_{RA}$ transmitted from the rear axle. In the partially locked state, the clutch torque $M_{CLUTCH}$ which is actually set corresponds to the drive torque $M_{FA}$ which is transmitted from the front axle.

According to the invention, the control unit 8 or 10 specifies a displacement path φ which should result in an at least fully locked state of the transmission clutch 1 according to the referenced characteristic curve, i.e., the transmission clutch should not slip if the system is in proper working order. The control unit 8 or 10 subsequently checks whether there is actually no slip of the transmission clutch 1. To this end, as described above, the difference between the angular velocities $w_{FA}$ and $w_{RA}$ is preferably considered. If this difference is at least practically zero, the stored characteristic curve (for example, the solid line in FIG. 2, $φ_1$ being assigned to $M_{C\ setpoint\_1}$ and $φ_2$ to $M_{C\ setpoint\_2}$) is maintained. However, if slip is detected, which therefore represents too little torque on the transmission clutch 1, the characteristic curve is corrected in the sense of a basic increase in torque, or in the sense of an extension of the displacement path φ for the same setpoint clutch torque $M_{C\ setpoint}$ (for example, the dashed line in FIG. 2, $φ_1^*$ being assigned to $M_{C\ setpoint\_1}$ and $φ_2^*$ to $M_{C\ setpoint\_2}$).

The displacement path φ corresponding to the at least fully locked state according to the characteristic curve, i.e., the slip plausibility checking according to the invention, preferably is specified only for defined operating conditions, which in particular cannot be responsible for the occurrence of slip on one or more wheels. At least the following operating conditions are particularly advantageous for this purpose:

Exceeding a predetermined vehicle speed limit ($V_{VEH} > V_{Limit}$). (This essentially ensures a homogeneous coefficient of friction, since differences in the coefficient of friction between the axles become greater with increasing vehicle speed. Coefficients of friction above the natural frequency of the drive train are negligible for the slip plausibility checking according to the invention.)

Presence of equal tire longitudinal rigidities (k) for the wheels on the front axle and the wheels on the rear axle (the known slip curves for the front axle and for the rear axle should be in the linear region of the slip curve to ensure stable operation of all wheels without slip), as illustrated by reference numeral 20 in FIG. 1.

Straight-ahead driving (=>no kinematic slip during cornering)

Constant driving (=>no static and dynamic axial load transfers)

Level driving (=>no static and dynamic axial load transfers) and/or

Presence of at least one essentially steady-state condition of the system (in particular, the wheel slip gradients should be at least practically zero).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control system for an at least temporarily four wheel-driven motor vehicle, the control system comprising:
    a drive unit permanently coupled to primary drive wheels and coupled to secondary drive wheels as required; and
    a control unit, coupled to the drive unit, by which the drive torque of the drive unit may be variably distributed to primary and secondary drive wheels, and in order to distribute the drive torque, a clutch torque of a transmission clutch that is situated between the drive unit and the secondary drive wheels is adjusted by the control unit,
    wherein the control unit is arranged such that a displacement path for the actuator that actuates the transmission clutch is assigned to a setpoint clutch torque via a characteristic curve, and the control unit checks whether slip of the transmission clutch occurs when a displacement path is specified that should result in an at least fully locked state of the transmission clutch according to the characteristic curve.

2. A control system according to claim 1, wherein the characteristic curve is corrected for slip of the clutch torque in the sense of an extension of the displacement path for the same setpoint clutch torque.

3. A control system according to claim 1, wherein the displacement path corresponding to the at least fully locked state according to the characteristic curve is specified only for defined operating conditions which cannot be responsible for the occurrence of slip on one or more wheels.

4. A control system according to claim 3, wherein an operating condition is exceeding a predetermined vehicle speed limit ($V_{VEH} > V_{Limit}$).

5. A control system according to claim 3, wherein an operating condition is the presence of equal tire longitudinal rigidities (k) for the wheels on the front axle and the wheels on the rear axle.

6. A control system according to claim 3, wherein an operating condition is at least essentially straight-ahead driving.

7. A control system according to claim 3, wherein an operating condition is at least essentially constant driving.

8. A control system according to claim 3, wherein an operating condition is at least essentially level driving.

9. A control system for an at least temporarily four wheel-driven motor vehicle, the control system comprising:
    a drive unit permanently coupled to primary drive wheels and coupled to secondary drive wheels as required; and
    a control unit, coupled to the drive unit, by which the drive torque of the drive unit may be variably distributed to primary and secondary drive wheels, and in order to distribute the drive torque, a clutch torque of a transmission clutch that is situated between the drive unit and the secondary drive wheels is adjusted by the control unit,
    wherein the control unit is arranged such that a displacement path for the actuator that actuates the transmission clutch is assigned to a setpoint clutch torque via a characteristic curve, and the control unit checks whether slip of the transmission clutch occurs when a displacement path is specified that should result in an at least fully locked state of the transmission clutch according to the characteristic curve,
    wherein the displacement path corresponding to the at least fully locked state according to the characteristic curve is specified only for defined operating conditions which cannot be responsible for the occurrence of slip on one or more wheels, and
    wherein an operating condition is the presence of an at least essentially steady-state condition of the system.

10. A method for a control system for an at least temporarily four wheel-driven motor vehicle, the method comprising the acts of:
- variably distributing, by a control unit coupled to a drive unit, drive torque to primary and secondary drive wheels;
- adjusting, by the control unit in order to distribute the drive torque, a clutch torque of a transmission clutch that is situated between the drive unit and the secondary drive wheels;
- assigning a displacement path for an actuator that actuates the transmission clutch to a setpoint clutch torque via a characteristic curve; and
- checking, by the control unit, whether slip of the transmission clutch occurs when a displacement path is specified that should result in an at least fully locked state of the transmission clutch according to the characteristic curve.

11. A method according to claim 10, wherein the characteristic curve is corrected for slip of the clutch torque in the sense of an extension of the displacement path for the same setpoint clutch torque.

12. A method according to claim 10, wherein the displacement path corresponding to the at least fully locked state according to the characteristic curve is specified only for defined operating conditions which cannot be responsible for the occurrence of slip on one or more wheels.

13. A method according to claim 12, wherein an operating condition is exceeding a predetermined vehicle speed limit ($V_{VEH} > V_{Limit}$).

14. A method according to claim 12, wherein an operating condition is the presence of equal tire longitudinal rigidities (k) for the wheels on the front axle and the wheels on the rear axle.

15. A method according to claim 12, wherein an operating condition is at least essentially straight-ahead driving.

16. A method according to claim 12, wherein an operating condition is at least essentially constant driving.

17. A method according to claim 12, wherein an operating condition is at least essentially level driving.

18. A method according to claim 12, wherein an operating condition is the presence of an at least essentially steady-state condition of the system.

* * * * *